(12) United States Patent
Trahan et al.

(10) Patent No.: US 9,729,658 B2
(45) Date of Patent: Aug. 8, 2017

(54) SYSTEM FOR MANAGING WEB-BASED CONTENT DATA AND APPLICATIONS

(76) Inventors: Chris Trahan, San Jose, CA (US); David Olszewski, Campbell, CA (US)

(*) Notice: Subject to any disclaimer, the term of this patent is extended or adjusted under 35 U.S.C. 154(b) by 124 days.

(21) Appl. No.: 13/317,133

(22) Filed: Oct. 11, 2011

(65) Prior Publication Data

US 2012/0089704 A1    Apr. 12, 2012

Related U.S. Application Data

(60) Provisional application No. 61/404,860, filed on Oct. 12, 2010, provisional application No. 61/463,539, filed on Feb. 22, 2011.

(51) Int. Cl.
| | |
|---|---|
| *G06F 9/50* | (2006.01) |
| *H04L 29/08* | (2006.01) |
| *G06F 3/0488* | (2013.01) |
| *G06F 3/0485* | (2013.01) |

(52) U.S. Cl.
CPC ........ *H04L 67/2838* (2013.01); *G06F 3/0485* (2013.01); *G06F 3/0488* (2013.01); *G06F 9/5072* (2013.01); *H04L 67/2833* (2013.01)

(58) Field of Classification Search
CPC .............................. G06F 9/5072; G06F 3/0485
USPC ........ 709/203, 217, 218, 219; 715/737, 772, 715/753, 863, 830, 751
See application file for complete search history.

(56) References Cited

U.S. PATENT DOCUMENTS

| | | | |
|---|---|---|---|
| 6,247,032 B1* | 6/2001 | Bernardo | G06F 17/211 707/E17.112 |
| 6,931,660 B1* | 8/2005 | Kalluri et al. | 725/131 |
| 7,930,419 B2* | 4/2011 | Mullig et al. | 709/231 |
| 8,490,002 B2* | 7/2013 | Fai | 715/753 |
| 8,494,544 B2* | 7/2013 | Patoskie et al. | 455/453 |
| 2002/0149630 A1* | 10/2002 | Kitainik et al. | 345/863 |
| 2004/0193413 A1* | 9/2004 | Wilson et al. | 704/243 |
| 2005/0015357 A1* | 1/2005 | Shahidi | G06F 17/30997 |
| 2005/0078170 A1* | 4/2005 | Firestone et al. | 348/14.08 |
| 2005/0108328 A1* | 5/2005 | Berkeland et al. | 709/204 |
| 2005/0278643 A1* | 12/2005 | Ukai et al. | 715/751 |
| 2007/0044086 A1* | 2/2007 | Sampath | G06F 8/20 717/168 |
| 2007/0234388 A1* | 10/2007 | King | 725/39 |
| 2008/0246851 A1* | 10/2008 | Jung et al. | 348/222.1 |
| 2009/0089352 A1* | 4/2009 | Davis et al. | 709/201 |
| 2009/0138562 A1* | 5/2009 | Schmulen et al. | 709/206 |
| 2010/0146464 A1* | 6/2010 | Wilson et al. | 715/863 |
| 2011/0107220 A1* | 5/2011 | Perlman | 715/720 |
| 2011/0122063 A1* | 5/2011 | Perlman et al. | 345/161 |

(Continued)

*Primary Examiner* — Jimmy H Tran
(74) *Attorney, Agent, or Firm* — James A. Gavney, Jr.; JAG Patent Services

(57) ABSTRACT

A cloud-based computer system and architecture for managing and migrating through web-based content data and content applications from multiple content data sources or service providers in real time is disclosed. The cloud-based computing system and architecture of the present invention includes a log-in or master server that acts as a single point access and supports a single user interface. The single user interface is preferably an icon-based master web-page with a slide tool that allows a user to scroll or page through the content data and/or content applications from the multiple content data sources or service providers in real time from a logged in remote computer device.

18 Claims, 2 Drawing Sheets

(56) References Cited

U.S. PATENT DOCUMENTS

| | | | |
|---|---|---|---|
| 2011/0136511 A1* | 6/2011 | Patoskie et al. | 455/456.3 |
| 2011/0150430 A1* | 6/2011 | Prestenback | G11B 27/105 386/295 |
| 2011/0161802 A1* | 6/2011 | Jia | G06F 17/24 715/235 |
| 2011/0231796 A1* | 9/2011 | Vigil | 715/810 |
| 2011/0242317 A1* | 10/2011 | Wengrovitz | 348/143 |
| 2011/0289143 A1* | 11/2011 | Polis et al. | 709/203 |
| 2012/0023410 A1* | 1/2012 | Roth et al. | 715/737 |
| 2012/0023431 A1* | 1/2012 | Roth et al. | 715/772 |
| 2012/0113239 A1* | 5/2012 | Krupnik et al. | 348/65 |
| 2014/0006930 A1* | 1/2014 | Hollis | G06F 17/2247 715/234 |
| 2014/0019492 A1* | 1/2014 | Woods | G06Q 10/10 707/806 |

\* cited by examiner

SYSTEM FOR MANAGING WEB-BASED CONTENT DATA AND APPLICATIONS

RELATED APPLICATION

This patent application claims priority under 35 U.S.C. 119 (e) of the U.S. Provisional Patent Application Ser. No. 61/404,860 filed Oct. 12, 2010, and titled "COMPUTER NETWORK SYSTEM FOR MANAGING WEB-BASED CONTENT DATA" and the U.S. Provisional Patent Application Ser. No. 61/463,539 filed Feb. 22, 2011, and titled "SYSTEM FOR MANAGING WEB-BASED SWIPE MODULE TOOL AND SOFTWARE FOR SCROLLING AND PAGING THROUGH CONTENT DATA AND APPLICATIONS". The U.S. Provisional Patent Application Ser. No. 61/404,860 filed Oct. 12, 2010, and titled "COMPUTER NETWORK SYSTEM FOR MANAGING WEB-BASED CONTENT DATA" and the U.S. Provisional Patent Application Ser. No. 61/463,539 filed Feb. 22, 2011, and titled "SYSTEM FOR MANAGING WEB-BASED SWIPE MODULE TOOL AND SOFTWARE FOR SCROLLING AND PAGING THROUGH CONTENT DATA AND APPLICATIONS" are both hereby incorporated by reference.

FIELD OF THE INVENTION

This invention relates to computer systems for managing web-based content data in a cloud-based computing environment. More particularly, the present invention relates to computer systems for managing and migrating through web-based content data in a cloud-based computing environment from multiple content data sources through a single point of access and/or user interface from a remote computing device.

BACKGROUND OF THE INVENTION

Cloud-based computing provides computation, software, data access, and storage services that do not require a user to have knowledge of the physical location and configuration of the system and architecture that delivers the content data and/or services. Cloud-based computing can include the delivery of any kind of content data and/or services in real-time, which extend the capabilities to a remote computing device, typically over the internet.

Most cloud-based computing systems and architectures include a master sever that networks to other service provider servers and streams content data to the master server that is then accessed through the remote computing device. Cloud-based computing provides for the ability to expand a user's ability to access the multiple sources of content data and/or services through the master server. However, currently available computing systems requires multiple log-in procedures for accessing the multiple sources of content data and/or services and/or do not provide for the ability to manage the content data and/or services from multiple sources through a single user interface. Accordingly, the present invention is directed to a cloud-based computing system and architecture for managing the content data and/or services from multiple sources through a single user interface in real time.

SUMMARY OF THE INVENTION

There are a few known computer systems and architectures that allow you to migrate through content data using a scrolling-type feature or tool, hereafter a scrolling application. The first example of a scrolling application, includes a scrolling software that typically runs on mobile computing devices, such as smart phones, computer tablets and the like. In this scrolling application, a user swipes through content data contained in different files that are stored directly on the mobile device. The content data is then displayed the on a screen of the mobile computing device. The user can then initiated a call, play, send or execute function by, for example, selecting an icon which instructs the mobile computing device to accesses additional content data over the internet. In this scrolling application, the user is paging or migrating through content data in files that have been downloaded and stored on the mobile computing device itself.

A second type of scrolling application includes a "plug-in and play" software that is operated from a computing device, such as a lap-top or desk-top computer. In a plug-in and play environment, a user downloads the plug-in and play software from their computing device and the plug-in and play software then allows the user to execute functions for scrolling or migrating through various web-pages of content data displayed on a web-site interface in a "slide-like" presentation. In this case, the computing device must be compatible with the plug-in and play software and the plug-in and play software is not capable of being integrating directly into web-based application, such as to allow the user to migrates through content data from multiple content data sources through a single user interface in real time.

The present invention is directed to a cloud-based computer system and architecture for managing and migrating through web-based content data and content applications from multiple content data sources or service providers in real time. The cloud-based computing system and architecture of the present invention includes a log-in or master server that acts as a single point access and supports a user interface.

Preferably, the log-in or master server that is in communication with the multiple content data sources or service providers via servers. The user interface is preferably an icon-based master web-page viewable over the master server from a remote computing device. In further embodiments of the invention, the master web-page includes features for displaying and migrating through personal content data, such as those provided by networking web-sites and e-mail web-sites.

In operation, a user logs into the log-in or master server over the internet/intranet from a remote computing device. The server accesses the multiple content data sources or provider through their respective servers in the cloud-based computing environment based on enabled user or account preferences. The log-in or master server is programmed to run and execute a master content application software that is coded for organizing content data and content applications from the multiple content sources or service providers on a single master web-page. The master web-page is a "dynamic" in the sense that the master web-page displays streaming content data and content applications from the multiple content data sources in real time.

The master content application software, hereafter master program, is further configured to program the remote computing device with code to operate a slide tool. The slide tool allows a user to scroll or page through the content data and/or content applications in real time from master server on a master web-page from the remote computer device.

Unlike prior art cloud-based computing system and architectures, the present invention is capable of being integrated directly into the content applications from the multiple content data sources or service providers and, thus, is capable of providing for the ability to migrate through the content data on the dynamic master web-page in real time. Further, the present invention allows for the capability to add or subtract any number of content data sources or service providers. For example a user's log-in account can be customized to allow for only selected content data sources and application to run at any giving time. Also, the present invention allows for content data to be selected and copied from one or more of the content data sources or service providers and saved to the user's master web-page, the user's personal setting and, in some cases, to another content data source or service provider. The operations and activities of the user over the master web-page via the remote computing device is capable of being recorded and stored to provide user history analytics. The user history analytics can then be used select promotions, advertisement, news and other information that targets the user based on the operations performed and/or the content data sources or service providers that are used. These promotions, advertisement, news and other information can then be directed to the master web-page or the viewable content data can be modified to represent the user's apparent interests.

A master web-page, in accordance with the embodiment of the invention includes lock-out controls for security or for controlling user activity. For example, the master web-pages in further embodiments includes subsets of content data that are accessible depending on which user is logged into the master web-page. For example, a remote tool is configured deliver a subset of content data or applications to a third party enabled remote computing device to allow access only to the content data and/or applications that match an authorized user and/or a target audience.

The present invention provides a unique web-based database, user interface, remote slide tool and the user history analytics which is used as a comprehensive solution to manage content data and/or applications from multiple content data sources.

DETAILED DESCRIPTION OF THE INVENTION

To facilitate the clarity of the ensuing description, words and phrases listed below have been ascribed the following meanings:

1) Content data is any data or information that is stored remotely on servers that are generally accessible over the internet/intranet via a service provider servers.

2) Content applications are software applications that accesses display and organized content data, generally from a web-sites.

3) A log-in server or master server is a dedicated server for supporting a master program and user interface to access and view content data and applications from multiple content data sources or providers through a single user interface.

4) A tool is a feature that is usually represent by an icon, that are viewable and/or selectable from a from a computing device; selecting the tool will generally initiate one or more software sequences to access, display and/or organize content data on a web-page.

5) A tool-box is a set of sub-features, generally accessible through an administrator account or password, that allow a web-page layout and/or operation to be customized by linking tools with content applications.

6) A dynamic user web-page or master web-page is a web-page viewable remotely from a remote computing device via log-in server or master server and which displays a slide tool that scrolls or pages through content data and/or content application from multiple content data sources and/or or service providers in real time.

7) Cloud-based computer system or architecture includes multiple content data sources or service provider servers that are linked to a log-in server or master server via the internet/intranet.

8) A remote computing device is an electronic device that is capable of accessing the log-in server or master server over the internet/intranet and displaying or viewing a master web-page and content data therefrom.

Figure 1:
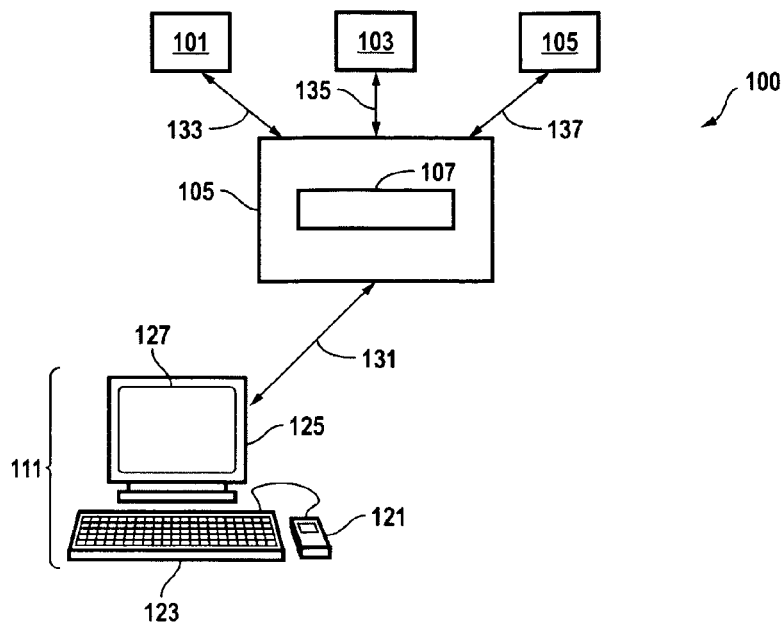
FIG. 1 is a schematic representation of a cloud-based computer architecture for managing web-based content data, in accordance with the embodiments of the invention.

FIG. 1 shows a schematic representation of a cloud-based computer system and architecture 100 for managing web-based content data, in accordance with the embodiments of the invention. The cloud-based computer system and architecture 100 includes a log-in server or master server 105 that acts a single point of access for a plurality of content data sources or service provider servers 101, 103, and 105. The plurality of content data sources or service provider servers 101, 103, and 105 are in communication or linked to the log-in server or master server 105 via a communication network, such as the internet or intranet represented by the arrows 133, 135 and 137.

The log-in server or master server 105 supports a program to run and execute a master content application software, hereafter master application, represented by the box 107. The master application 107 is coded for organizing content data and content applications from the multiple content sources or service provider servers 101, 103 and 105 on a master web-page 201, 201' and 201" (FIGS. 2A-C), such as described below.

In operation, a user (not shown) logs into the log-in server or master server 105 over the internet/intranet, represented by the arrow 131 from a suitable remote computing devices 111. A suitable remote computing device 111 is for example, a desk top computer 125 with a monitor or display 127 and a keyboard 123 and mouse 121 for entering information and executing functions. Alternatively, a suitable computing device is a laptop computer, a tablet computer, a smart phone or any other electronic device that is capable of accessing the log-in server or master server 105 over the internet/intranet and displaying or viewing content data therefrom on a master web-page a 201, 201' and 201" (FIGS. 2A-C), such as described below.

Figures 2A, 2B:
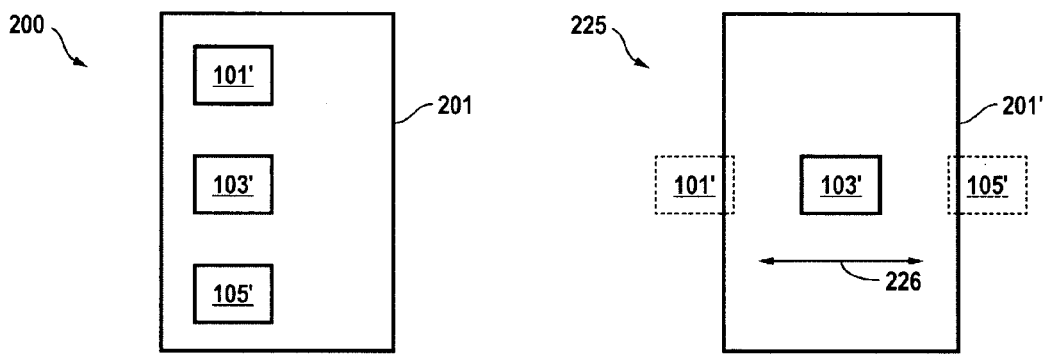
FIG. 2A shows a representation dynamic user web-page or master web-page for simultaneously displaying content data and/or content applications from multiple content sources simultaneously, in accordance with the embodiments of the invention.
FIG. 2B shows a representation dynamic user web-page for displaying and scrolling or paging through content data and/or content application from multiple content sources in real-time with a slide tool, in accordance with the embodiments of the invention.
Figure 2C:
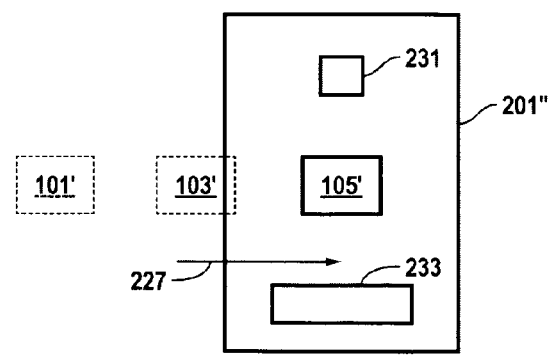
FIG. 2C shows a representation dynamic user page that further includes personal account features, in accordance with the embodiments of the invention.

FIG. 2A shows a representation of a dynamic user web-page or master web-page 201 for simultaneously displaying content data and/or content application 101', 103 and 105' from the corresponding set of content sources or service provider servers 101, 103 and 105 through a log-in server or master server 105, in accordance with the embodiments of the invention.

Referring now to FIG. 2B, in accordance with a preferred embodiment of the invention a master web-page 201' includes a slide tool or scrolling tool indicated by the arrow 226 operable from the computing device 111 (FIG. 1). In operation, when the remote computing device 111 logs into the log-in server or master server 105 over the internet/intranet, for at least the first time, the log-in server or master server 105 and the master application 107 initiates a down load of software on to the remote computing device 111 that enables the slide tool or scrolling tool 226 to operable from an user input interface, such as a keyboard 123, a mouse 121, a touch screen (not shown) or any other suitable user interface on the remote computing device 111.

With the remote computing device 111 enabled with the slide tool or scrolling tool 126, a user can view his or her master web-page 201' and scroll through or page through content data and content applications 101', 103 and 105' from corresponding set of content data sources or service provider servers 101, 103, and 105 in real time.

In accordance with further embodiments of the invention, a master web-page 201" includes a slide tool or scrolling tool indicated by the arrow 227 operable from any suitable user interface on the remote computing device 111, such as describe above. In addition, the master application 107 is equipped with a tool box that allows an authorized user or administrator to build the master web-page 201" and include features for displaying and migrating through personal content data, such as those provided by a networking web-site or an e-mail web-site 233. In operation, portions of content data and/or portions of content applications 101', 103 and 105' from the corresponding set of content sources or service provider servers 101, 103 and 105 are capable of being selected and copied using the computing device 111 and saved to the user's master web-page 201" or one or more of the user's personal accounts. Also, the master web-page 201" preferably includes a search tool or function 231 that allows a user to search for selected content data and content applications 101', 103 and 105' from each content data sources or service provider servers 101, 103, and 105 individually or simultaneously.

As described above, the The cloud-based computer system and architecture 100, the master application 107 and corresponding tool box provides for the capability to include lock-out controls, collect history analytics and have subsets of accessible content data or content applications.

Figure 3A:
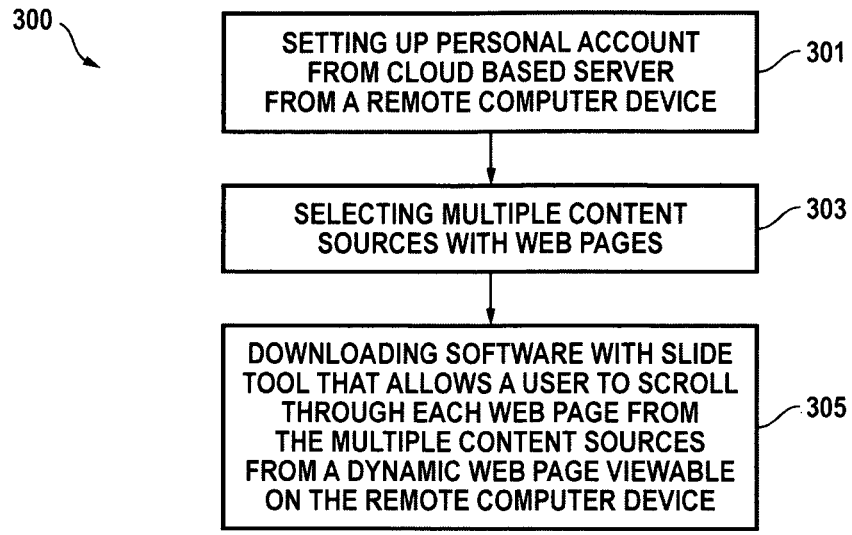
FIGS. 3A-B shows block-flow diagrams outlining steps for managing the content data or applications from the multiple content sources or service providers through a single point of access and user interface, in accordance with the method of the present invention.

FIG. 3A shows a block-flow diagram 300 outlining steps, in accordance with the method of the present invention. In the step 301, a personal account is set up from on a cloud-based log-in or master server 105 (FIG. 1) from the remote computing device 111 (FIG. 1). The account set up procedure includes establishing a user name and password. In the step 303, an administrator or authorized user selects which security features are enabled, which content sources or service providers are accessible, which personal setting or features are accessible and constructs the general layout of a master web-page via the tool box on the master application 107 (FIG. 1).

After the personal account is set up and the master web-page is constructed in the steps 301 and 303, in the step 305 the master application 107 initiates a down load of software on to the remote computing device 111 that enables a the slide tool or scrolling tool 226 and 227 (FIGS. 2B-C) to operable from a user input interface on the remote computing device 111.

Figure 3B:
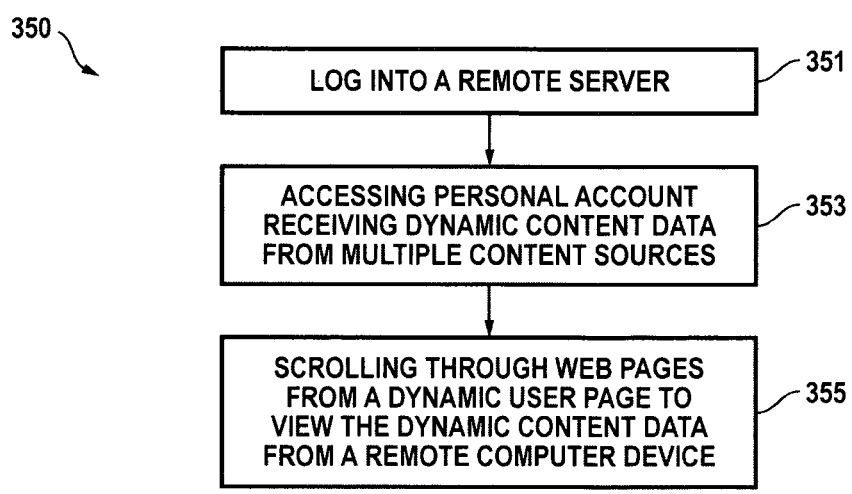

FIG. 3B shows a block-flow diagram 350 outlining steps, in accordance with a further method of the present invention. After a user personal account has been established, the content sources or service providers have been selected and the scrolling tool software has been down loaded, such as described above with reference to FIG. 3A, in the step 351 the user is capable of logging into the log-in or master server 105 (FIG. 1) using the remote computing device 111 (FIG. 1). After the user logs into the log-in or master server in the step 351, in the step 353 the user accesses his or her personal or shared master-web-page and views or manages content data and/or content applications 101', 103' and 105' (FIGS. 2A-C) from the corresponding content sources or service providers 101, 103 and 105 (FIG. 1). While logged into the log-in server or master server 105, in the step 355 the user is capable of using the slide tool or scrolling tool 226 and 227 (FIGS. 2B-C) to page through and manage content data and/or content applications 101', 103' and 105' from the multiple content sources or service providers 101, 103 and 105 and search for selected content data and content applications 101', 103 and 105' from each content data sources or service provider servers 101, 103, and 105 using the search tool 231.

As described previously, the user is also capable of accessing personal content providers enabled during the set-up procedure described above. Also, the user is capable of selecting content data and/or content applications and coping the selected content data and/or content applications to the user's master web-page or the user's personal content data account.

The present invention provides an expandable solution for managing content data in a cloud-based computing environment which is capable of being integrated into applications from multiple sources. The invention provides users with a highly interactive experience and the ability migrate through the content data and applications on the dynamic master web-page in real time. The dynamic master web-page preferably includes an icon-based interface and is capable delivering a broad spectrum of content data such as marketing data, sales data, operations data, manufacturing data, financial data, documents, spreadsheets, presentations, audio data, video data, database listings, custom or off the shelf business applications, games, or any other content data or application data.

What is claimed is:

1. A cloud-based computer system comprising:
a) master server with a processor and memory, wherein the master server accessible over the internet/Intranet from remote computer devices by a user;
b) a master application stored in the memory of the master server and that executes on the processor of the master server and that includes software coded for organizing content data and content applications from multiple content sources or service providers pre-selected by the user and streamed to the master server simultaneously in real time from their respective servers on a master web-page and are viewable from the remote computer devices through the master server on the master web-page, wherein the master application programs a processor on the remote computer devices to operate and execute a slide tool program for scrolling or paging through the content data or the content applications from the multiple content sources or service providers simultaneously and through the master server in real time from the master web-page and from the remote computer by operating the slide tool program from the remote computer; and c) a remote tool box feature application that allows the user to write code, select code or delete code to enable and disable tool features that control how sub-sets of the content data or the content applications from the multiple content sources or service providers are received, displayed or organized, wherein the master server collects analytics based which tool features are enabled to target specific products, services or information to the user.

2. The cloud-based computer system of claim 1, wherein the content sources or service providers include one or more personal content account and at least one or more social media account belonging to the user.

3. The cloud-based computer system of claim 2, wherein the personal content account is an e-mail account.

4. The cloud-based computer system of claim 1, wherein the master application includes tools for enabling security features that limits access to one or more of the content sources or service providers based a user log-in belonging to the user.

5. The cloud-based computer system of claim 1, wherein the master server collects and stores history analytics based content data and content applications viewed by the user.

6. The cloud-based computer system of claim 5, the master application includes a purchase tool that allows the user to purchase goods or services from the multiple content sources or service providers from master web-page.

7. A computer system with a master server with a memory and a processor for storing and executing a master application with a remote tool box feature that programs a processor on a remote computer with a slide tool program for scrolling or paging through content data or content applications from multiple content data sources or service providers enabled by a user simultaneously on a web-page created by the master application and hosted on the master server using hardware on remote computer, wherein the content data or content applications are simultaneously streamed to the master server from servers of multiple content data sources or service providers over the internet in real time to an account belonging to the user, wherein the remote tool box feature allows the user to write code, select code or delete code to enable and disable tool features that control how sub-sets of the content data or the content applications from the multiple content sources or service providers are received, displayed or organized and wherein the master server collects history analytics based which tool features are enabled to target specific products, services or information to the user.

8. The computer system of claim 7, wherein the master server collects and stores history analytics based on usage of the remote computer.

9. The computer system of claim 8, wherein the master server uses the history analytics to select content data or the content applications based on a user log-in belonging to the user.

10. The computer system of claim 7, wherein the user interface is an icon-based master web-page.

11. The computer system of claim 7, wherein one of the content sources or service providers includes an e-mail web-site belonging to the user.

12. A method of navigating content data or content applications from multiple servers of multiple content sources or service providers through a master web-page hosted and created on a cloud-based master server from a remote computer, the method comprising:

a) setting up an account on the cloud-based master server which streams the content data or content applications from the multiple servers of the multiple content sources or service providers simultaneously to the cloud-based master server; and b) constructing the master web-page on the cloud-based master server from the remote computer via a tool box software stored on memory of the cloud-based master server and executed on a processor of the cloud-based master server and that is accessible from the remote computer, wherein a user navigates through the content data or content applications from the multiple content sources or service providers through master web-page in real time from the remote computer using a slide tool program executed from the remote computer, wherein the tool box software allows the user to write code, select code or delete code to enable and disable tool features that control how sub-sets of the content data or the content applications from the multiple content sources or service providers are received, displayed or organized;

c) simultaneously searching analytics based which tool features are enabled to target specific products, services or information to the user; and d) purchasing the specific products, services or information from at least one of the multiple content sources or service providers from the master web-page.

13. The method of claim 12, wherein setting up the account includes one or more of enabling security features and selecting personal settings.

14. The method of claim 12, wherein one of the multiple content sources or service providers is an c-mail content source or service provider.

15. The method of claim 12, wherein the user interface is an icon-base web-page.

16. The method of claim 15, further comprising logging the cloud-based master server from a remote computer, wherein the cloud-based master server initiates a down load of software on to the remote computer that enables the slide tool program.

17. The method of claim 16, further comprising selectively viewing the content data or content applications from the multiple content sources or service providers by scrolling or paging through the content data or content applications using the slide tool program.

18. The method of claim 12, further comprising storing the analytics in the memory of the cloud-based master server.

* * * * *